United States Patent [19]

Kern et al.

[11] Patent Number: 5,556,118
[45] Date of Patent: Sep. 17, 1996

[54] FLAT BED CART

[75] Inventors: Alan R. Kern; John A. LaFleur, both of Richmond; George Hand, Midlothian; Bruce Ferris, Richmond, all of Va.

[73] Assignee: Rehrig International, Inc., Richmond, Va.

[21] Appl. No.: 368,899

[22] Filed: Jan. 5, 1995

[51] Int. Cl.$^6$ ........................................... B62B 3/00
[52] U.S. Cl. ........................... 280/47.16; 280/47.34; 280/79.11
[58] Field of Search ................. 280/47.16, 47.34, 280/79.11, 79.3; 108/901, 902, 52.1, 51.1, 56.1

[56] References Cited

U.S. PATENT DOCUMENTS

| | | |
|---|---|---|
| D. 294,760 | 3/1988 | Vanderdoes, Sr. . |
| D. 326,748 | 6/1992 | Kirk . |
| 1,239,498 | 9/1917 | Madigan ............................ 280/47.16 |
| 1,418,929 | 6/1922 | House ................................ 280/47.16 |
| 1,538,054 | 5/1925 | Ohnstrand ......................... 280/47.16 |
| 1,728,436 | 9/1929 | Morrison . |
| 1,740,000 | 12/1929 | Andrews et al. ................... 280/47.16 |
| 1,832,770 | 11/1931 | Hallowell ........................... 280/47.16 |
| 2,414,277 | 1/1947 | Shepard, Jr. et al. ............. 280/47.34 |
| 2,712,452 | 7/1955 | Hallowell et al. ................. 280/79.11 |
| 3,837,667 | 9/1974 | Sernovitz . |
| 4,077,644 | 3/1978 | Roby et al. . |
| 4,165,088 | 8/1979 | Nelson . |
| 4,316,419 | 2/1982 | Cupido .................................. 108/901 |
| 4,458,906 | 7/1984 | Lamson . |
| 5,351,628 | 10/1994 | Breezer et al. ...................... 108/51.1 |

FOREIGN PATENT DOCUMENTS

| | | |
|---|---|---|
| 0251439A2 | 1/1986 | European Pat. Off. . |
| 0487147A1 | 5/1992 | European Pat. Off. . |
| 1595210 | 8/1981 | United Kingdom . |

Primary Examiner—Kevin Hurley
Assistant Examiner—Min Yu
Attorney, Agent, or Firm—Bacon & Thomas

[57] ABSTRACT

A flat bed cart includes a molded resin load carrying bed having longitudinally spaced ends, a generally planar upper side and a bottom side that includes a plurality of ribs, a pair of spaced, longitudinally extending slots and first, second and third sets of integrally molded fastener mounted pads that are located adjacent the first and second ends of the bed and intermediate the ends respectively. The slots receive a pair of longitudinally extending reinforcing bars that carry at their ends upright handle receiving mounts. The handle receiving mounts include members arranged in recesses spaced about the periphery of the bed at the first and second ends thereof. At least one handle is provided which is adapted to be selectively positioned within a respective pair of the upstanding handle receiving mounts. The cart also includes first and second swiveling caster wheel assemblies mounted to the underside of the bed at each end thereof through a pair of support blocks that extend laterally across the bed and a pair of centrally mounted enlarged wheels about which the cart can be pivoted for maneuvering purposes.

26 Claims, 4 Drawing Sheets

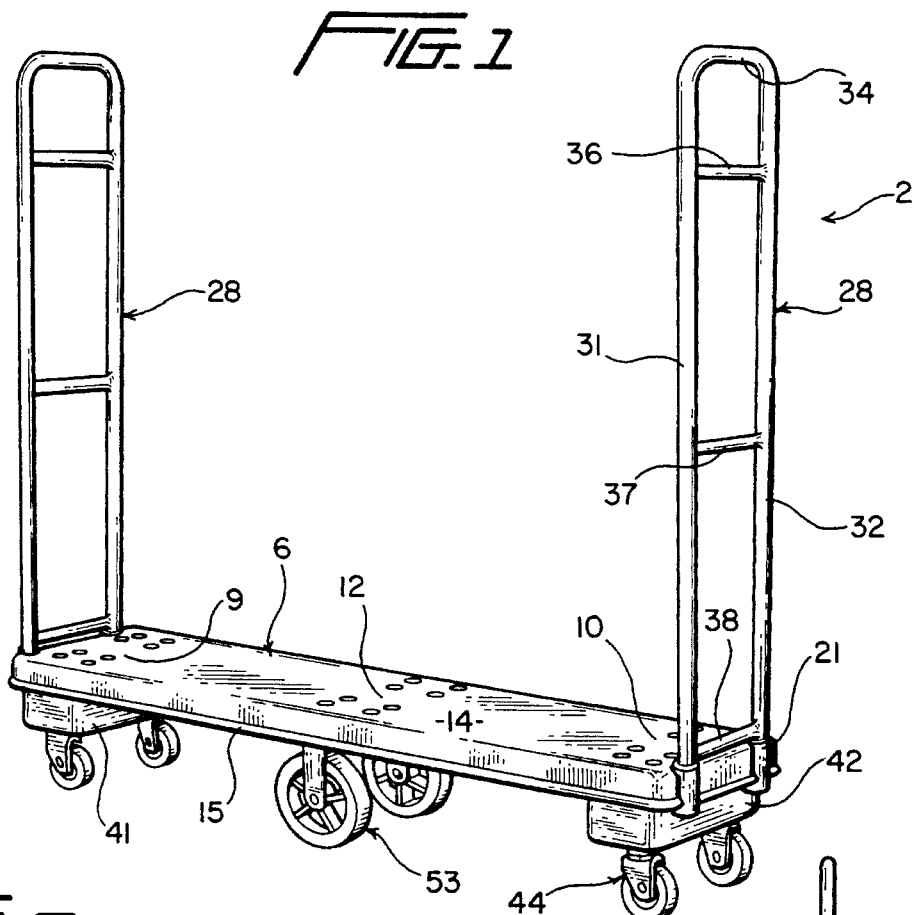
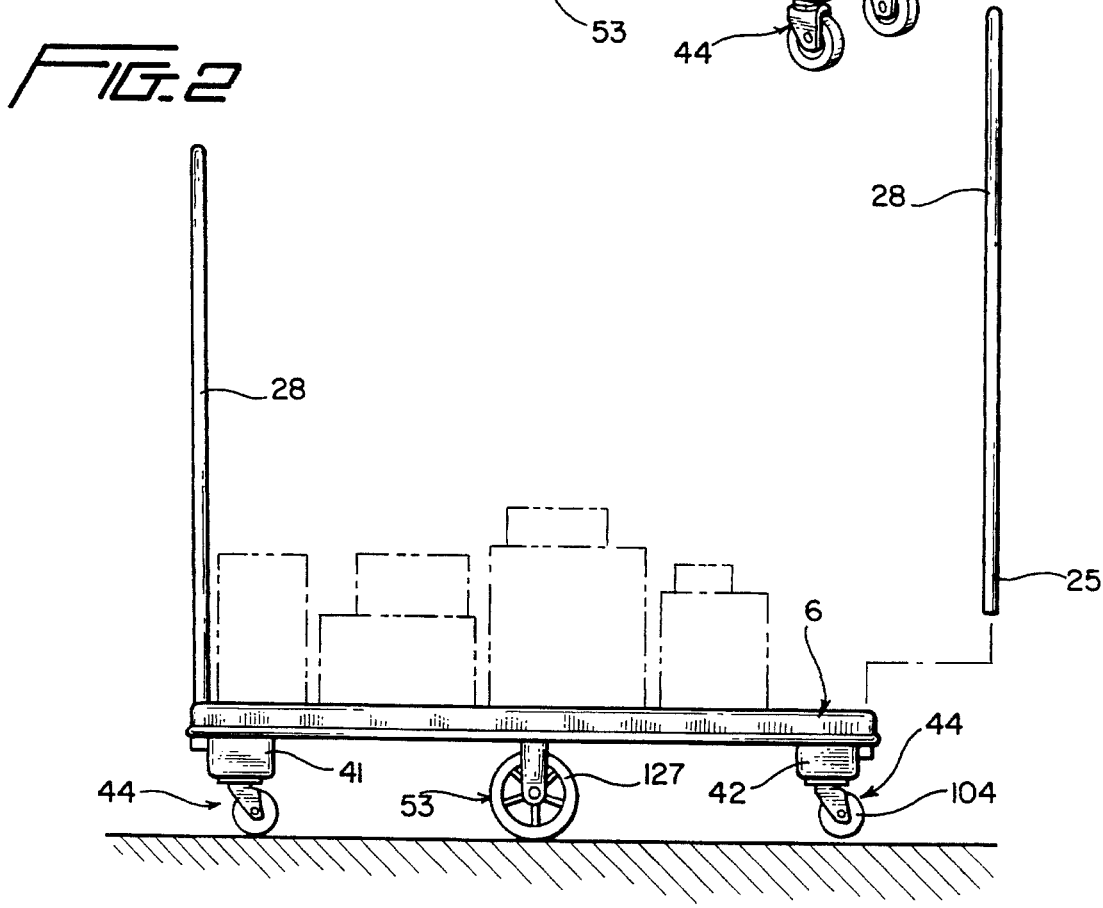

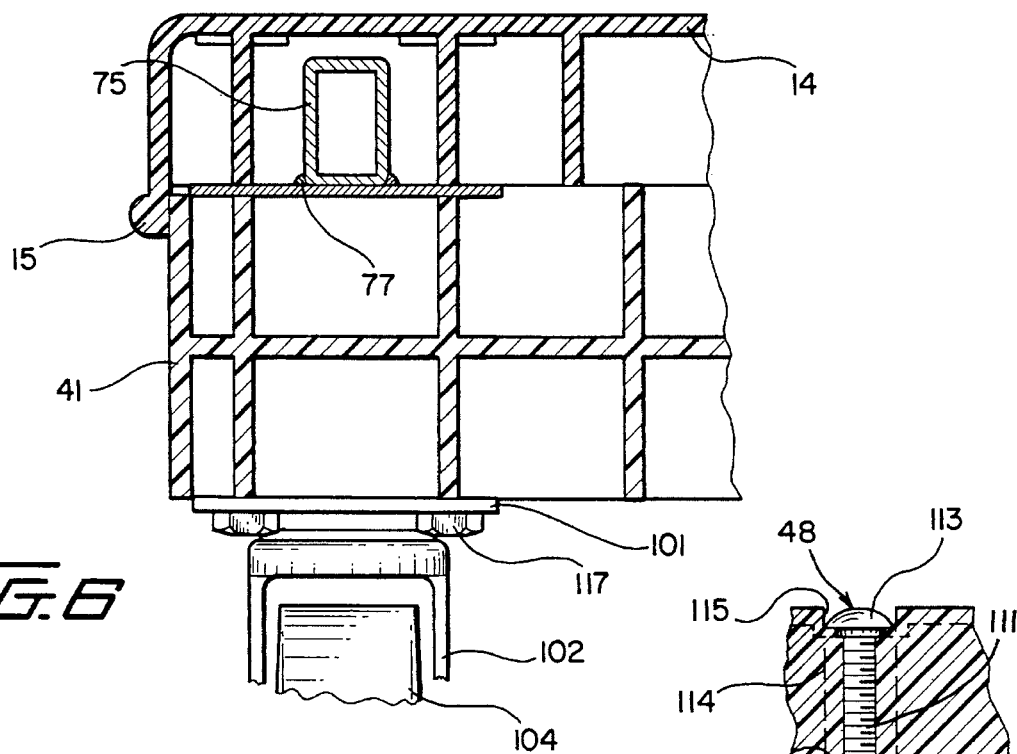
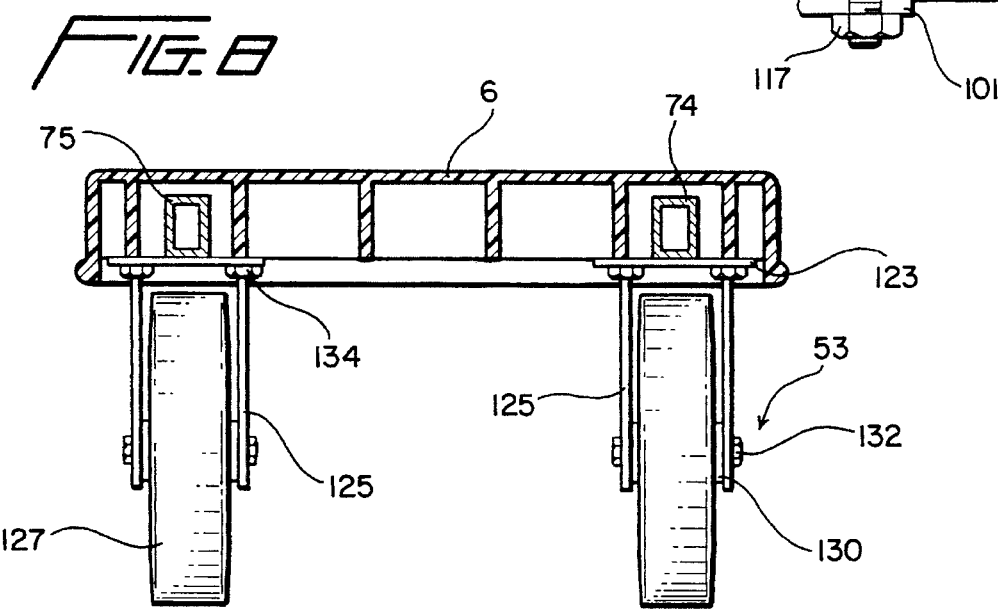

FLAT BED CART

BACKGROUND OF THE INVENTION

1. Field of the Invention

The present invention pertains to a flat bed hand cart for use in supporting and transporting articles.

2. Discussion of the Prior Art

Flat bed carts are widely used as stock carts and the like in both retail and grocery environments. A particular type of hand cart that is widely used in these and other environments includes a bed having a width that is narrow in design relative to its length. These types of hand carts, commonly referred to as "U-Boats" typically have widths of approximately 16 to 18 inches and measure up to approximately 63 inches in length. The carts generally include at least one handle and are often provided with up to six caster wheels. Due to their narrow design and the use of the caster wheels, these types of hand carts have excellent maneuverability.

The flat bed carts of this type presently available for use in a business or retail environment are commonly made of painted metal and therefore are somewhat unwieldy and heavy. The painted metal rapidly becomes chipped, scraped and dented so that the appearance of the carts deteriorates rapidly after they are first placed into use and maintenance of the carts is expensive and time consuming. Additionally, such metal beds have numerous welded joints that can break and rust over time, further increasing maintenance problems.

In general, the carts constructed in accordance with the prior art do not include certain features for protecting customers and the environment in which the carts are utilized. In certain environments, such as a retail establishment, the lack of protective features can result in considerable damage to store items and can further pose a risk to the ankles of store patrons. In addition, although the use of numerous caster wheels significantly aids in maneuvering such carts, the weight of these carts, inherent due to their construction, presents a limit on maneuverability and handling thereof which is often a contributing factor to damage caused when the cart hits retail items or store patrons.

It has also been heretofore proposed to form a flat bed cart with a plastic deck in order to reduce the overall weight associated with the cart. Although reducing the weight of the cart in this manner will improve the maneuverability and handling characteristics thereof, carts constructed in this manner generally have reduced weight capacities commensurate with the known metal flat bed carts, are not designed to optimize associated manufacturing and assembling costs and fail to incorporate various customer and environment protection features.

Therefore, there exists a need in the art for a light-weight U-Boat type can for use in supporting and transporting articles in various retail and business environments which is sturdy, has a high load capacity and possesses unique features that enhance efficiency and economy of manufacture while being user-friendly in a sense of minimizing risk of injury to customers and the environment in which the cart is to be used.

SUMMARY OF THE INVENTION

This invention provides a flat bed cart including an injection molded plastic bed that is reinforced by longitudinally extending metal bars. Preferably, the bed is constructed using a structural foam process in which an inert gas is directly injected into a plastic melt during injection and which expands during the molding process to provide an end product that has a tough, solid exterior skin and an internal rigid structure. A high density polyethylene resin material is preferably used and is colored so that the pigment extends throughout the entire bed. By this arrangement, the bed incorporated in the flat bed cart of the invention avoids the disadvantages inherent in painted metal carts that are prone to chipping, denting, rusting and peeling.

The bed according to the present invention is preferably molded with a ribbed or honeycombed underside to further reduce its weight while maintaining its rigidity. The underside is also integrally formed with a pair of spaced and longitudinally extending slots which receive the metal reinforcing bars and numerous integrally molded fastener mounting pads for securing a plurality of wheel assemblies to the underside of the can. More specifically, the mounting pads are arranged in sets located adjacent each longitudinal end of the bed and intermediate these ends. A pair of support blocks are provided which extend laterally across a respective set of fastener mounting pads at each end of the bed for mounting first and second sets of caster wheels. These caster wheels are permitted to swivel and are used in combination with larger, non-swiveling wheel assemblies secured to the centrally located fastener mounting pads. With this configuration, the cart is permitted to pivot on the center wheels which creates a tight turning radius for optimum maneuverability while also being selectively, steerably supported by at least one set of swiveling caster wheels.

The use of molded support blocks which extend laterally across the underside of the bed for mounting of the swiveling caster wheels facilitates assembly of the cart and further adds to the structural rigidity of the cart. Preferably, the metal reinforcing bars have secured thereto, adjacent each of their ends, a plate that is provided with multiple holes. Each of the support blocks is specifically configured to receive a respective one of the plates such that only a single set of fasteners is required to secure an end of each reinforcing bar, a side of each support block and a respective swiveling caster wheel assembly to the elongated bed. To ease this assembly process, the underside of the bed is also preferably formed with a plurality of laterally aligned projections against which the support blocks are positioned so as to assure proper alignment for mounting.

In order to aid in minimizing the risk of injury to individuals and the environment, the plastic bed is formed with a rounded bottom edge as well as multiple recesses arranged as pairs that are spaced along a periphery of the bed at each of the ends thereof. Each of these recesses receives an upright handle receiving member that is carried at the end of a respective reinforcing bar and which is adapted to receive a respective end of a handle. Each handle is preferably formed of metal that is chrome plated so as to be less likely to rust as compared to painted handles which would tend to become scratched and chipped when inserted or removed from the handle receiving members. By locating the handle receiving members and the handle itself within the external dimensions of the plastic bed, contact of the handle members with fixtures and persons in the environment of use of the cart is essentially eliminated.

Additional features and advantages of the flat bed cart of the present invention will become more readily apparent from the following detailed description of a preferred embodiment thereof when taken in conjunction with the following drawings wherein like reference numerals refer to corresponding parts and several views.

BRIEF DESCRIPTION OF THE DRAWINGS

FIG. 1 is a perspective view of the flat bed cart of the present invention;

FIG. 2 is a side elevational view of the flat bed cart of FIG. 1 with one handle thereof removed;

FIG. 6 is a cross-sectional view generally taken along line VI—VI of FIG. 4;

FIG. 7 is a cross-sectional view generally taken along line VII—VII of FIG. 4; and FIG. 8 is a cross-sectional view generally taken through an intermediate portion of the cart of FIG. 1.

DETAILED DESCRIPTION OF THE PREFERRED EMBODIMENT

Figure 3:
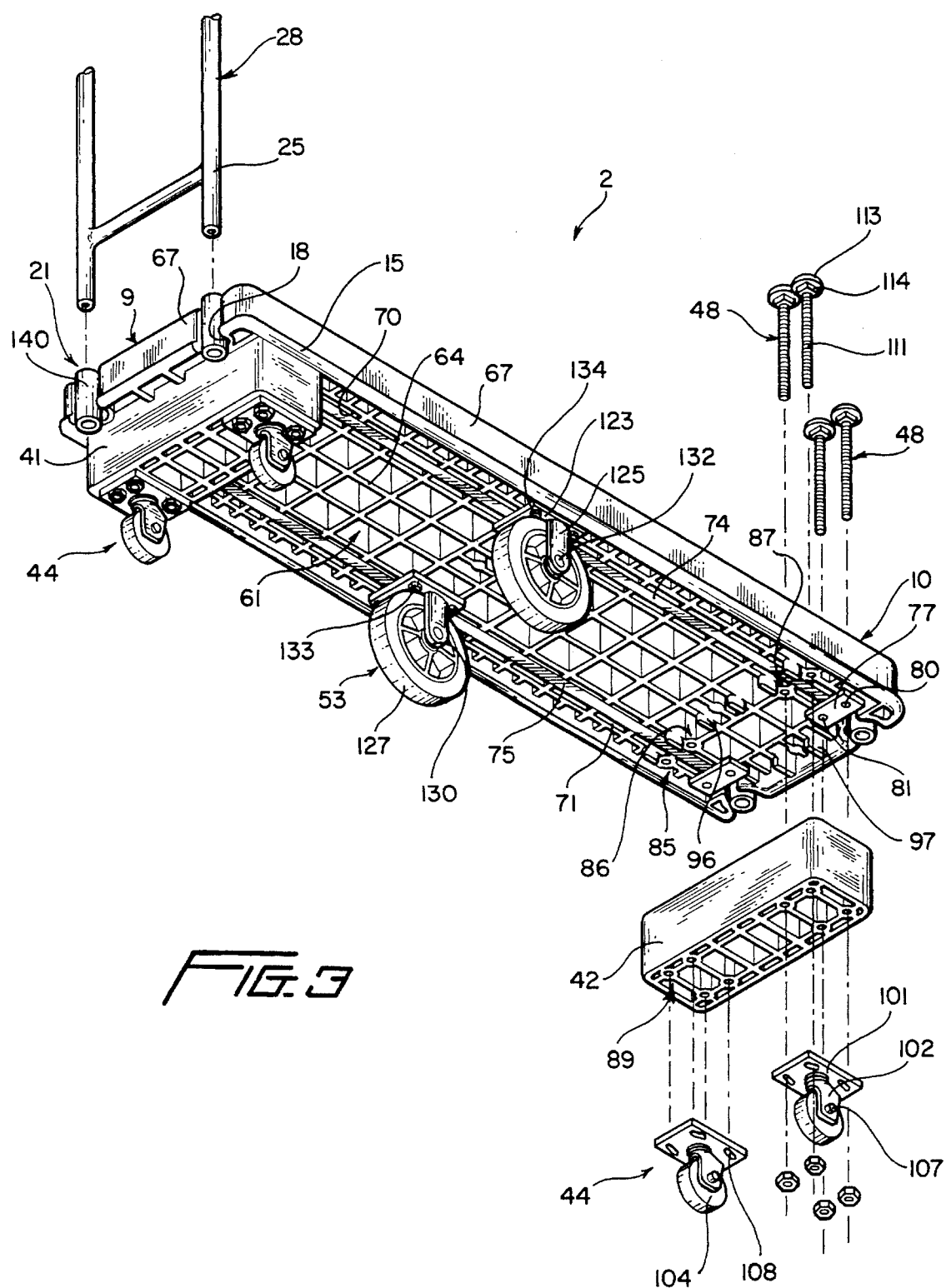
FIG. 3 is a partial exploded view of the flat bed cart of FIG. 1.

With initial reference to FIGS. 1 and 2, the flat bed cart of the present invention is generally indicated at 2 and includes a bed 6 having first and second longitudinal ends 9, 10 and a central portion 12. Bed 6 further includes a top surface 14, which, although not clearly illustrated in the drawings, is preferably textured in order to minimize sliding movement of articles placed thereon. Bed 6 is preferably injection molded using a high density polyethylene resin. More specifically, bed 6 is preferably constructed using a structural foam process in which an inert gas is directly injected into a plastic melt during injection and which expands during the molding process to provide an end product that has a tough, solid exterior skin and an internal rigid cellular structure. The resin material is also preferably colored so that a uniform pigment extends throughout bed 6. The texture in top surface 14 is simply created by the configuration of the mold cavity within which bed 6 is formed or could be provided by a separate roughening operation following molding of bed 6. Bed 6 is also integrally formed with a bead 15 that extends around substantially the entire periphery of bed 6. Bead 15 actually defines a rounded lower bottom edge of bed 6.

Figure 4:
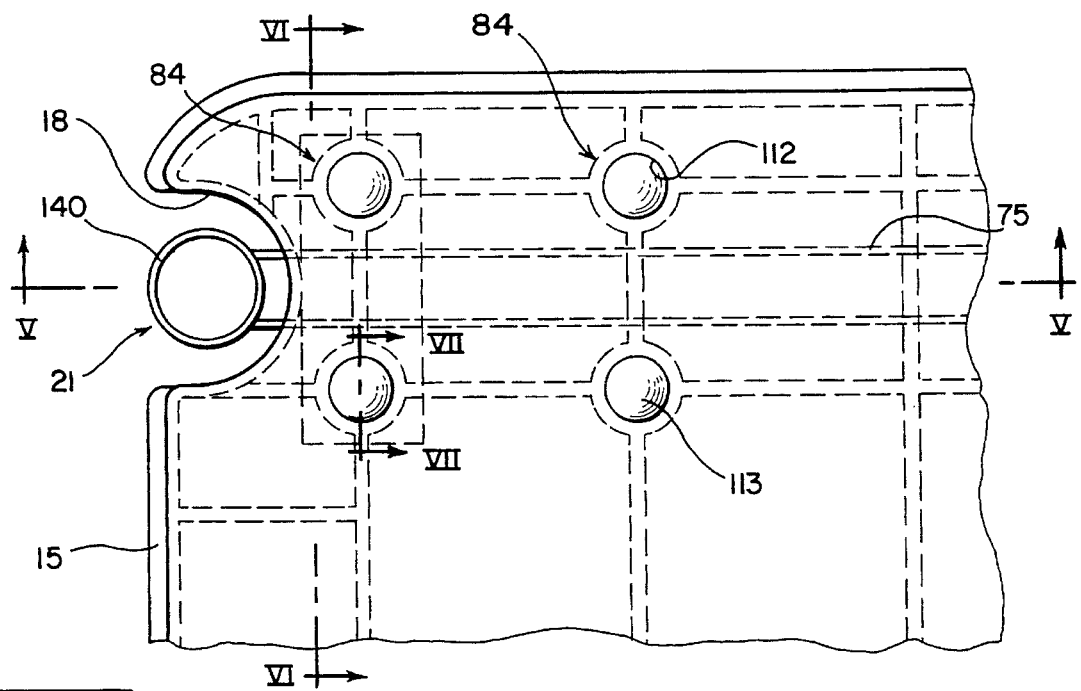
FIG. 4 is a top view of a corner portion of the bed incorporated in the cart of FIG. 1 with portions of the underside of the bed illustrated in phantom.

Bed 6, as also illustrated in FIG. 4, is further formed with a plurality of recesses 18 arranged as pairs that are spaced along the periphery of bed 6 at each of the first and second longitudinal ends 9 and 10 thereof. Recesses 18 are each adapted to receive a respective upright handle receiving mount 21 which, in turn, is adapted to receive an end 25 of a respective U-shaped handle member 28. In the preferred embodiment, two such handle members 28 are provided, one at each end of flat bed cart 2, and are readily removable from their respective upright handle receiving mounts 21. Each U-shaped handle member 28 includes first and second laterally spaced and substantially parallel members 31 and 32 that are joined at an upper end thereof by an interconnecting portion 34. First and second parallel members 31 and 32 are further interconnected by a plurality of vertically spaced cross bars 36–38. The respective cross bars 36–38 of each handle member 28 can be used to support removable shelves (not shown) if desired. In the preferred embodiment, each U-shaped handle member 28 is constructed of chrome plated, 12-gauge steel tubing that has a diameter of 1¼ inches. Each cross bar 36–38 is preferably welded to first and second parallel members 31 and 32 and the lowermost crossbar 38 further functions as a stop member for limiting the degree of insertion of the U-shaped handle member 28 within the paired upright handle receiving mounts 21. The specific arrangement and attachment of upright handle receiving mounts 21 with respect to bed 6 will be more fully discussed hereinafter.

Flat bed cart 2 further includes first and second support blocks 41 and 42 which are arranged at the first and second longitudinal ends 9 and 10 of bed 6 respectively. Support blocks 41 and 42 are utilized for mounting a plurality of swiveling caster wheel assemblies 44 to bed 6 by means of a plurality of fasteners 48. Flat bed cart 2 is further provided with a pair of central, non-swiveling wheel assemblies 53. The specific mounting of wheel assemblies 44 and 53 to bed 6 will be described more fully below in connection with a description of the underside construction of bed 6.

With reference now to FIG. 3, the bottom or underside of bed 6 is generally indicated at 61 and includes a plurality of intersecting ribs 64 which provide structural rigidity to bed 6 while also minimizing its weight. Ribs 64 extend and are integrally attached to sides 67 of bed 6 as clearly illustrated in FIG. 3. Underside 61 is also formed with a pair of spaced, elongated slots 70 and 71, each of which has an associated depth which is less than the height of either ribs 64 or sides 67 (also see FIG. 5). Each elongated slot 70, 71 is adapted to receive a respective metal reinforcing bar 74, 75 which enables bed 6 to carry greater loads by providing increased bending stability to bed 6. Each reinforcing bar 74, 75 has fixedly secured thereto a plate 77 at a respective end thereof. Each plate 77 is preferably provided with a pair of spaced throughholes 80 and 81 for securing reinforcing bars 74 and 75 to bed 6 in the manner set further below. Underside 61 of bed 6 is formed, adjacent first and second longitudinal ends 9 and 10, with first and second sets of fastener mounting pads 84 and 85. Fastener mounting pads 84 and 85 are configured in an identical and symmetrical manner and are used in securing a respective support block 41, 42 and swiveling caster wheel assemblies 44 to bed 6 in an identical fashion. The attachment of mounting support blocks 41 and 42 and its associated caster wheel assemblies 44 to bed 6 at first and second fastener mounting pads 84 and 85 will be described in detail with reference to portions of each of the attachment arrangements as shown in the drawings.

Figure 5:
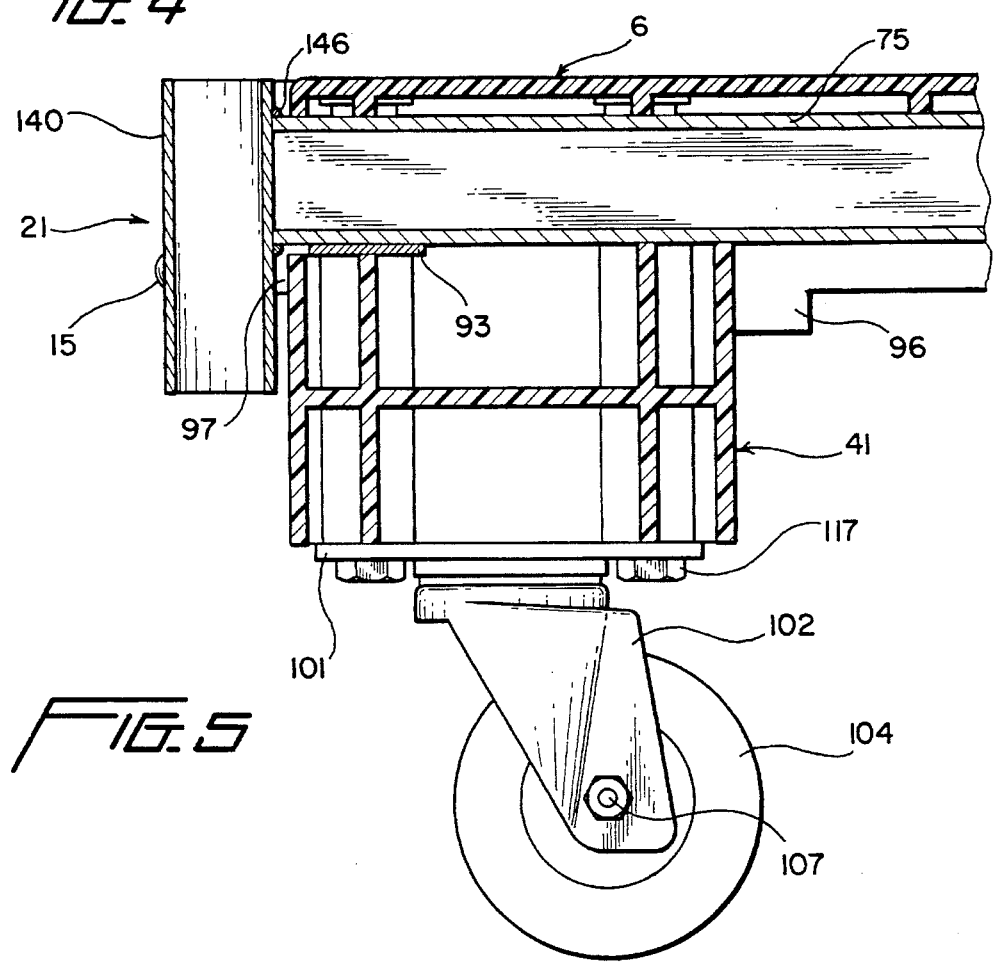
FIG. 5 is a cross-sectional view generally taken along line V—V of FIG. 4.

With reference to FIGS. 3–6, each set of fastener mounting pads 84, 85 includes first and second groups of holes 86, 87 with each group preferably including four holes that extend through bed 6 and which are arranged in a rectangular pattern. The plate 77 carried by each reinforcing bar 74, 75 at second longitudinal end 10 of bed 6 has its through holes 80, 81 respectively aligned with two of the holes in the groups of holes 86 and 87. Each support block 41, 42 is formed with similarly arranged groups of bores 89 and 90 such that, for example, when support block 42 is positioned against underside 61 of bed 6 at second longitudinal end 10, the groups of bores 89 and 90 are aligned with the groups of holes 86 and 87 as well as through holes 80 and 81 in each plate 77. In order to aid in positioning each support block 41, 42 in an appropriate position against underside 61 such that the desired alignment occurs and the structural integrity of flat bed cart 2 is further increased, each support block 41, 42 is preferably formed with at least one plateau portion 93 as best illustrated in FIG. 5. Plateau portion 93 has an associated height substantially equal to the thickness of each plate 77 and is adapted to receive plates 77 as best illustrated in FIG. 5. In addition, underside 61 is preferably formed with a first set of laterally spaced projections 96 which are longitudinally spaced from a second set of laterally spaced projections. By this arrangement, the first and second sets of laterally spaced projections 96 and 97 extend about a respective support block 41, 42 when the support block 41, 42 is positioned against underside 61. Therefore, first and second laterally spaced projections 96 and 97 function to index the support block 41, 42 to an appropriate position wherein plates 77 are positioned against plateau portion 93 and the various bores 89 and 90 formed in the support block 41, 42 are aligned with the groups of holes 86 and 87 formed in bed 6.

Once the support block 41, 42 is appropriately positioned against underside 61, two swiveling caster wheel assemblies 44, each of which includes a mounting plate 101 to which is rotatably mounted a bifricated bracket 102 through a suitable bearing arrangement (not shown) as is widely known in the art and a wheel 104 that is rotatably mounted to bifricated bracket 102 through an axle member 107, is arranged against support block 42. More specifically, mounting plate 101 is formed with four rectangularly arranged through slots 108 which are adapted to be aligned with a respective group of bores 89 or 90. Once arranged in this manner, a threaded shaft portion 111 of each fastener 48 is inserted through a respective mounting hole 112 provided in the top surface 14 of bed 6 (also see FIG. 7) and extends through a respective one of the groups of holes 86 and 87 formed in bed 6, as well as a respective one of the groups of bores 89 and 90 formed in the support block 41, 42 and a through slot 108 in a respective mounting plate 101. The fasteners 48 closest to the first and second longitudinal ends 9 and 10 of bed 6 also extend through a respective through hole 80, 81 formed in each plate 77. Fasteners 48 are continuously inserted until head 113 of each fastener 48, which is integrally formed with a polygonally shaped nut portion 114 as best illustrated in FIG. 3, extends within a recess 115 formed in an upper surface 14 of bed 6 (see FIG. 7). Polygonally shaped nut portion 114 is adapted to extend into a similar shaped recess (not labeled) formed in bed 6 to prevent relative rotation of each fastener 48 relative to bed 6. Nuts 117 are then threadably secured upon shaft 111 in order to fixedly secure together bed 6, reinforcing bars 74 and 75, support blocks 41 and 42, and the various swiveling caster wheel assemblies 44.

With specific reference to FIGS. 3 and 8, the mounting of central, non-swiveling wheel assemblies 53 to bed 6 will now be described. Each central wheel assembly 53 is defined by a mounting plate 123, a pair of laterally spaced arms 125 that are fixedly secured to and extend downwardly from mounting plate 123 and a wheel 127 having a hub portion 130. Hub portion 130 is rotatably mounted upon axle member 132 which extends between and is secured to arms 125. In a manner analogous to the mounting of swiveling caster wheel assemblies 44 to bed 6, bed 6 is also provided with a plurality of centrally located holes (not labeled) and each central wheel assembly 53 is secured to bed 6 by a plurality of threaded fasteners 133 and nuts 134 which extend through bed 6 and mounting plate 123.

When wheel assemblies 44 and 53 are secured to bed 6 in the manner described above, flat bed cart 2 is adapted to be supported upon the ground as generally illustrated in FIG. 2. As clearly shown in this figure, each wheel 127 of central wheel assemblies 53 are larger in diameter than the individual wheels 104 of swiveling caster wheel assemblies 44. With this arrangement, when placed on a substantially horizontal ground surface as shown in FIG. 2, only one set of swiveling caster wheel assemblies 44, located at the first and second longitudinal ends 9 and 10 of bed 6 respectively, will engage the ground at any given time. By this arrangement, flat bed cart 2 can be readily maneuvered through the U-shaped handle member 28 provided at either of the first and second longitudinal ends 9 and 10 of bed 6. Flat bed cart 2 will actually pivot on central wheels 127 to enable a tight turning radius for optimum maneuverability and can be readily steered with the aid of a swiveling caster wheel assembly 44. This enhanced maneuverability minimizes the potential for injury to others or items around flat bed cart 2. In addition, the presence of bead 15 provides a smoothly contoured and reduced area contact surface in the event of direct engagement with bed 6. Therefore, the specific configuration of bed 6 minimizes risk of injury to others in the environment where the cart is used.

Flat bed cart 2 is designed to further minimize the risk of potential injury in the specific manner in which upright handle receiving mounts 21 are arranged with respect to bed 6. More specifically, each upright handle receiving mount 21 is generally defined by an upright handle receiving mount member 140 (see FIGS. 3–5) that preferably constitutes a tube. In the preferred embodiment shown, as best illustrated in FIG. 5, each upright handle receiving member 140 is directly fixedly secured to a respective reinforcing bar 74, 75 by means of a weld joint 146. As shown, each upright handle receiving mount member 140 is located within a respective recess 18 formed in bed 6 as mentioned above. As should be readily evident from viewing FIGS. 4 and 5, locating upright handle receiving mount member 140 within a corresponding recess 18 enables upright handle receiving mount member 140 to be positioned inwardly of bead 15. This arrangement substantially eliminates any potential contact between upright handle receiving mounts 21 with objects adjacent flat bed cart 2. Since upright handle receiving mounts 21 are preferably formed from metal, direct engagement with these members can cause particular injury to the ankles of people and also articles arranged in the environment in which the flat bed cart 2 is utilized. By arranging upright handle receiving mount members 140 within recesses 18, this potential problem is substantially alleviated. In addition, since upright handle receiving mount members 140 are located entirely within the outer periphery of bed 6, they will not catch on articles of clothing or the like or cause other direct damage at the height of bed 6.

From the above description, it should be readily apparent that the flat bed cart 2 of the present invention will be much lighter in weight than corresponding metal carts associated with the prior art and yet will have comparable load capacity characteristics due to its construction. In addition, flat bed cart 2 can be readily maneuvered due to the wheel configurations utilized and is constructed in a manner which takes into account various safety considerations.

Although described with respect to a preferred embodiment of the invention, it should be readily understood that various changes and/or modifications can be made to the present invention as described without departing from the spirit of the invention. In general, the invention is only intended to be limited by the scope of the following claims.

We claim:

1. A flat bed cart comprising:
   an elongated bed constituted by a unitary molded plastic member having first and second longitudinally spaced ends, a generally planar upper side, a bottom side and generally upstanding sidewalls, said bottom side including a plurality of ribs, a pair of spaced, longitudinally extending slots and first and second sets of integrally molded fastener mounting pads, each of said fastener mounting pads including a plurality of grouped holes extending through the upper and bottom sides of said bed with said first and second sets of fastener mounting pads being laterally spaced adjacent the first and second ends of said bed respectively;

a pair of longitudinally extending metal reinforcing bars respectively positioned within said pair of slots;

a pair of support blocks, each of said support blocks including a plurality of bores extending therethrough and being positioned across a respective set of said first and second sets of fastener mounting pads;

a plurality of wheel assemblies; and a plurality of fasteners for securing each of said wheel assemblies, said reinforcing bars and said support blocks simultaneously to said bed with said fasteners being engaged with said wheel assemblies while extending through said bores and within said fastener mounting pads.

2. A flat bed cart as claimed in claim 1, wherein each of said reinforcing bars includes first and second longitudinally spaced end portions, said flat bed cart further comprising an upstanding handle receiving member attached to each of the first and second end portions of said reinforcing bars.

3. A flat bed cart as claimed in claim 2, wherein said bed further includes a plurality of recesses arranged as pairs that are spaced along an outer periphery and open outwardly of said bed, each of said upstanding handle receiving members being positioned entirely within a respective one of said plurality of recesses such that adjacent sections of said sidewall extend longitudinally beyond said upstanding handle receiving members.

4. A flat bed cart as claimed in claim 2, further comprising at least one handle including a pair of spaced, substantially parallel members which terminate in respective end sections, each of said end sections being adapted to be received in one of said upstanding handle receiving members of each of said reinforcing bars respectively.

5. A flat bed cart as claimed in claim 4, wherein said handle further includes a cross bar spanning between and directly interconnecting said pair of spaced, substantially parallel members adjacent said end sections thereof, said cross bar limiting the degree of insertion of said end sections into said upstanding handle receiving members.

6. A flat bed cart as claimed in claim 1, wherein each of said reinforcing bars includes first and second longitudinally spaced end portions, said flat bed cart further comprising a plurality of plates, each of said plates being secured to a respective one of said first and second end portions of said reinforcing bars and including at least one hole therein that receives a respective one of said plurality of fasteners such that said reinforcing bars are attached to said bed simultaneously with said support blocks and wheel assemblies.

7. A flat bed cart as claimed in claim 6, wherein each of said support blocks is formed with at least one plateau portion adjacent the bottom side of said bed, each of said plateau portions receiving a respective one of said plurality of plates.

8. A flat bed cart as claimed in claim 1, wherein the bottom side of said bed is further provided with a set of laterally spaced and integrally molded auxiliary fastener mounting pads located intermediate the first and second longitudinally spaced ends of said bed.

9. A flat bed cart as claimed in claim 8, further comprising a pair of auxiliary wheel assemblies respectively fastened to said bed at said auxiliary fastener mounting pads.

10. A flat bed cart as claimed in claim 9, wherein each of said pair of auxiliary wheel assemblies is directly fastened to the bottom side of said bed and incorporates a wheel that is larger in diameter than wheels incorporated in each of the wheel assemblies attached to said support blocks.

11. A flat bed cart as claimed in claim 1, wherein said bottom side is formed with at least one projection extending adjacent each of said first and second sets of fastener mounting pads and against which said pair of support blocks are respectively positioned.

12. A flat bed cart comprising;

an elongated bed constituted by a unitary, integrally molded plastic member having first and second longitudinally spaced ends, a generally planar upper side, a bottom side and generally upstanding sidewalls defining an outer periphery of said bed, said bottom side including a plurality of ribs, at least one longitudinally extending slot and first and second sets of integrally molded fastener mounting pads located adjacent the first and second ends of said bed respectively, said bed further including a plurality of recesses arranged as pairs that are spaced along the outer periphery and open outwardly of said bed at each of said first and second ends thereof;

a pair of longitudinally extending reinforcing bars respectively positioned within said at least one slot, each of said reinforcing bars including first and second longitudinally spaced end portions located at said fastener mounting pads;

a pair of reinforcing plates fixedly attached to the first and second end portions of each of said reinforcing bars, each of said reinforcing plates including at least one through hole;

a plurality of handle mounting units, each of said handle mounting units being attached to a respective one of the first and second end portions of said reinforcing bars and including an upright handle receiving member that is positioned within a respective one of said recesses;

a plurality of wheel assemblies; and means for fastening each of said wheel assemblies to said bed at a respective one of said mounting pads while simultaneously attaching said reinforcing bars to said bed by extending through the through holes provided in said reinforcing plates.

13. A flat bed cart as claimed in claim 12, further comprising at least one handle including a pair of spaced, substantially parallel members which terminate in respective end sections, each of said end sections being adapted to be received in a respective one of said upstanding handle receiving members.

14. A flat bed cart as claimed in claim 13, wherein said handle further includes a cross bar interconnecting said pair of spaced, substantially parallel members adjacent said end sections thereof, said cross bar limiting the degree of insertion of said end sections into said upstanding handle receiving members.

15. A flat bed cart as claimed in claim 12, further comprising a pair of support blocks each of which includes a plurality of bores extending therethrough, said support blocks extending substantially entirely laterally across said bed and being positioned between a respective one of said first and second sets of fastener mounting pads and a respective one of said wheel assemblies.

16. A flat bed cart as claimed in claim 15, wherein each of said support blocks is formed with at least one plateau portion adjacent the bottom side of said bed, each of said plateau portions receiving a respective one of said plurality of plates.

17. A flat bed cart as claimed in claim 15, wherein said bottom side is formed with at least one projection extending adjacent each of said first and second sets of fastener mounting pads and against which said pair of support blocks are respectively positioned.

18. A flat bed cart as claimed in claim 12, wherein the bottom side of said bed is further provided with a set of laterally spaced and integrally molded auxiliary fastener mounting pads located intermediate the first and second longitudinally spaced ends of said bed.

19. A flat bed cart as claimed in claim 18, further comprising a pair of auxiliary wheel assemblies respectively fastened to said bed at said auxiliary fastener mounting pads.

20. A flat bed cart as claimed in claim 19, wherein each of said pair of auxiliary wheel assemblies is directly fastened to the bottom side of said bed and incorporates a wheel that is larger in diameter than wheels incorporated in each of the wheel assemblies attached to said support blocks.

21. A flat bed cart comprising:

an elongated bed constituted by an integrally molded plastic member having first and second longitudinally spaced ends, a generally planar upper side, a bottom side and generally upstanding sidewalls defining an outer periphery of said cart, said bottom side including a plurality of ribs, a portion of the sidewalls located at at least one of said first and second longitudinally spaced ends of the bed being provided with at least one recess on the outer periphery that opens outwardly of said bed;

a plurality of handle receiving members, each of said handle receiving members being positioned entirely within said at least one recess such that adjacent sections of said sidewall extend longitudinally beyond said handle receiving members;

first and second support elements positioned at the bottom side and extending substantially entirely laterally across said bed at the first and second longitudinally spaced ends respectively;

first and second sets of wheels, said first and second sets of wheels being attached to said bed through said first and second support elements respectively with each of said first and second sets of wheels being vertically spaced from the bottom side of said bed by a respective one of said first and second support elements; and a third set of wheels attached to said bed between said first and second longitudinally spaced ends.

22. A flat bed cart as claimed in claim 21, further comprising a handle having first and second ends, wherein the handle receiving members located at said at least one of said first and second longitudinally spaced ends of the bed receive the first and second ends of the handle respectively.

23. A flat bed cart as claimed in claim 21, wherein said third set of wheels comprises two wheels that are spaced laterally on said bottom side, each of said two wheels having an associated first diameter and wherein each of said first and second sets of wheels also comprises two wheels that are spaced laterally on said bottom side, each of the wheels of said first and second sets of wheels having an associated second diameter which is smaller than said first diameter.

24. A flat bed cart as claimed in claim 21, wherein each of said support elements comprises a structural block formed of plastic.

25. A flat bed cart as claimed in claim 21, wherein said at least one recess comprises a pair of laterally spaced recesses and wherein each of said first and second support elements extends across said bed a lateral distance which is greater than a lateral distance spanning between outermost portions of said pair of laterally spaced recesses.

26. A flat bed cart as claimed in claim 21, wherein said portion of the sidewalls is provided with a pair of laterally spaced recesses and each of said handle mounting units are positioned in a respective one of said recesses.

* * * * *